United States Patent
Shivaprasad et al.

(10) Patent No.: US 9,910,759 B2
(45) Date of Patent: Mar. 6, 2018

(54) LOGGING FRAMEWORK AND METHODS

(71) Applicant: SAP SE, Walldorf (DE)

(72) Inventors: Praveen Shivaprasad, Bangalore (IN);
Lakshmy Chandran, Bangalore (IN);
Kunal Parsewar, Bangalore (IN);
Vishnu Gowda Harish, Bangalore (IN); Sneha Ranganath, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/958,613

(22) Filed: Dec. 3, 2015

(65) Prior Publication Data

US 2017/0161166 A1    Jun. 8, 2017

(51) Int. Cl.
  *G06F 9/44*   (2006.01)
  *G06F 11/34*  (2006.01)
  *G06F 11/30*  (2006.01)
  *G06F 11/36*  (2006.01)

(52) U.S. Cl.
  CPC ...... *G06F 11/3476* (2013.01); *G06F 11/3024* (2013.01); *G06F 11/36* (2013.01)

(58) Field of Classification Search
None
See application file for complete search history.

(56) References Cited

U.S. PATENT DOCUMENTS

2012/0317116 A1 * 12/2012 Sonoda ............... G06F 11/3006
                                                            707/737

* cited by examiner

*Primary Examiner* — Qamrun Nahar
(74) *Attorney, Agent, or Firm* — Schwegman Lundberg & Woessner, P.A.

(57) ABSTRACT

A system comprising one or more processors executing a first process and a second process, a memory storing log information for the first process and the second process, and one or more logging components, executing on the one or more processors. The one or more logging components are configured to identify a first log event associated with the first process, generate an event identifier (ID) based on the first log event, transfer the event ID to the second process, identify a second log event associated with the second process and based on the first log event, and associate the event ID with the second log event in the memory.

14 Claims, 7 Drawing Sheets

LOGGING FRAMEWORK AND METHODS

TECHNICAL FIELD

This document relates generally to software systems, and more particularly to a logging framework for managing and analyzing log files generated by software systems.

BACKGROUND

In the field of computer software, logging is a feature of many software systems and applications, such as in operating systems, web applications, middleware, and databases. Log messages may be generated by the various components of a software system or application. Application developers may program the components to write log messages to a log stream or log file to, for example, provide status information about the application, provide a warning about a condition identified by the application, or identify an error that has occurred within the application, just to name a few. For example, when an application is first started, log messages are often generated to verify that the subsystems used by the application have been properly established or accessed, and that the application itself has properly started. When exceptions occur, the application generates log messages to assist with problem determination. For example, the application may generate a stack trace showing the state of the application or system at the time of the exception. These log messages generated by the application may be used as an audit trail by application administrators.

BRIEF DESCRIPTION OF DRAWINGS

The present disclosure illustrates embodiments of the inventive subject matter by way of example and not limitation, and with reference to the following drawings, in which like numbers represent like components.

DETAILED DESCRIPTION

The description that follows includes example systems, methods, techniques, instruction sequences, and computing machine program products that embody illustrative embodiments of the disclosure. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Some systems or applications, such as client-server type applications, may include multiple components that interact and communicate to provide various services to the users of the system. For example, a typical web server environment that provides dynamic content to Internet users may include web servers, application or middleware servers, and database servers. Each of these component servers may include multiple applications or application components that perform features necessary for the entire web serving software system to properly and fully function. Further, each of these components may generate log files.

During an error event in such multi-component systems, errors in one component often have reciprocal effects in other components (e.g., causing log messages to be generated by other components). An administrator may log onto one server (e.g., a web server) to attempt analysis of the problem, but the root cause of the problem may not have been on the web server. As such, the administrator may need to then log onto another server to analyze other log files. Analyzing log files individually and manually can be time consuming, as well as difficult, particularly for less-experienced administrators. Further, time delays or errors in diagnosis due to the difficulties in manually analyzing multiple log files may lead to increased outage or "down time" in the computer servers and their associated software systems and applications.

These and other technical problems may be addressed by the logging framework described herein. The embodiments disclosed herein implement a logging framework which centralizes all of the logs within a system into a single, central repository. The logging framework links related events using a common identifier (e.g., a unique "event identifier"), such as events across multiple server or application components, each stemming from a common underlying error condition. All events which are logged due to a common cause are linked by the common identifier, which creates a chain of related log messages that may be used by administrators to analyze the related messages across multiple components.

The logging framework includes multiple logging components, a logging agent, a log database, and a log viewer. The logging components are installed or otherwise incorporated into multiple participating servers, applications, or processes, and may be implemented as an extension of a Java-based logging tool or framework, such as "log4j" (promulgated by the Apache Software Foundation). The logging component generates a unique event identifier for a log event (e.g., at the time of a Java exception) and propagates the event identifier to the logging agent as a part of a log message associated with the log event. The logging component may also propagate the event identifier to another calling process or application (e.g., a "client" process that initiated a request that resulted in the exception). This secondary process may also generate a log event (e.g., associated with the underlying Java exception from the first process), and the secondary process includes the same unique event identifier in this second log event.

The logging agent receives both of the log events, including the event identifier, from the first process and the second process. The logging agent parses and stores these log events in the log database in a centralized fashion. In other words, the logging agent consolidates log events from multiple servers, applications, or processes (e.g., the logging components) into a central location (e.g., the logging database). The log viewer enables administrators to view the consolidated log events from the logging database. Further, because related log events from multiple processes, applications, or servers each include a shared, unique event identifier, the log viewer enables administrators to view related log events from multiple sources. As such, the log viewer provides a consolidated view of log events for the administrator, thereby reducing the complexity of log analysis and streamlining the technical troubleshooting process related to certain types of events.

Figure 1:
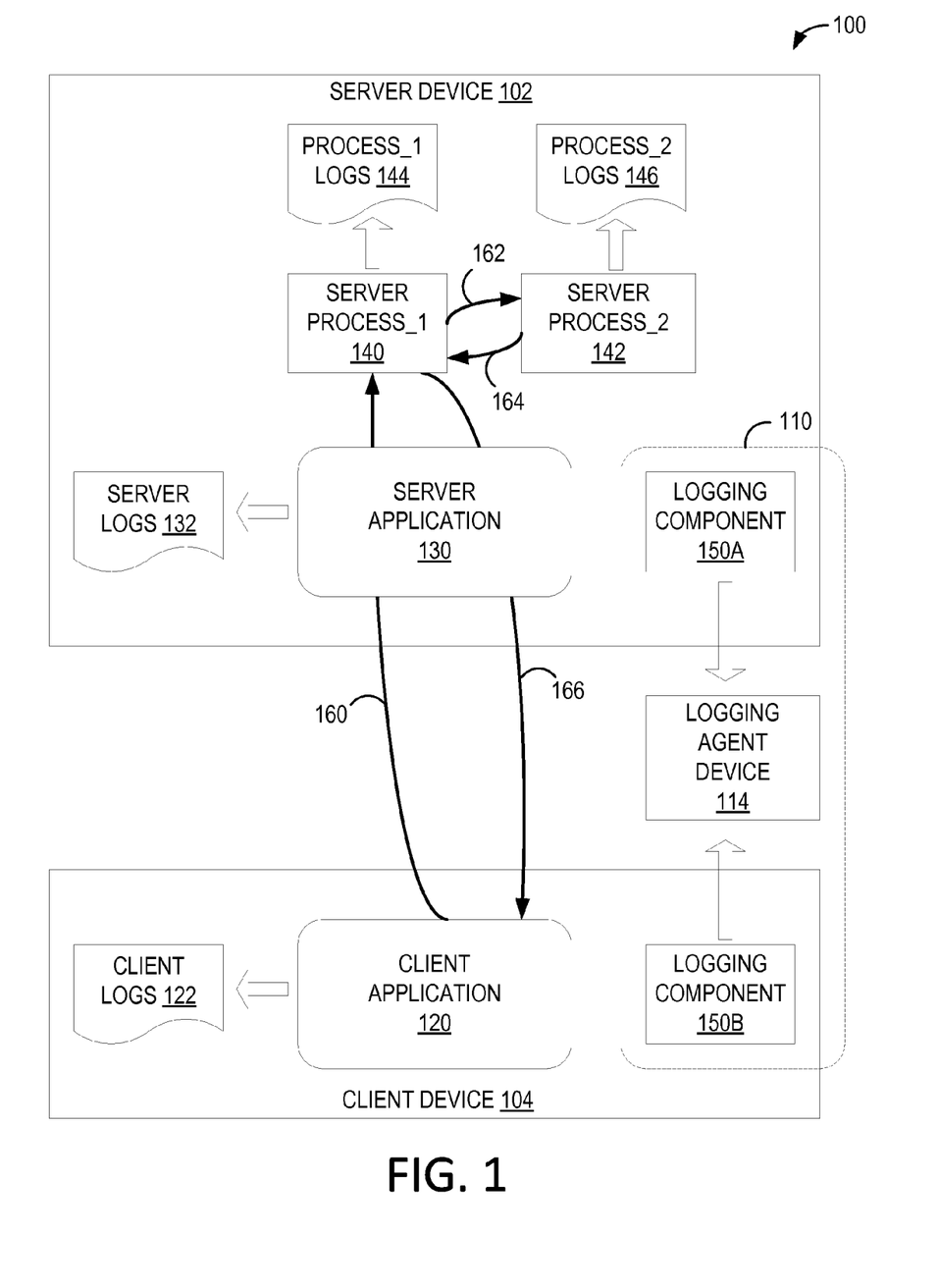
FIG. 1 is a block diagram illustrating a networked architecture, in accordance with an example embodiment, that includes elements of a logging framework.

FIG. 1 is a block diagram illustrating a networked architecture 100, in accordance with an example embodiment, that includes elements of a logging framework 110. Two computing devices are depicted in the networked architecture 100: a server device 102 and a client device 104. The devices 102, 104 and a logging agent device 114 are coupled together in networked communication by a computer network such as a local area network (LAN) or the Internet (not separately shown).

The client device 104 includes a client application 120. In the example embodiment, the client application 120 includes one or more application components written in Java. During execution of the client application 120, the client application 120 may generate log messages, such as error log messages or Java exception messages. The client application 120 or an underlying operating system (OS) of the client device 104 (not separately shown) may write the log messages to a client logs 122 database (e.g., a text file locally stored on the client device 104).

The server device 102 includes a server application 130. In the example embodiment, the server application 130 includes one or more application components written in Java. During execution of the server application 130, the server application 130 may generate log messages, such as error log messages or Java exception messages. The server application 130 or an underlying OS of the server device 102 (not separately shown) may write the log messages to a server logs 132 database (e.g., a text file locally stored on the server device 102).

Further, the server device also executes a server process_1 140 and a server process_2 142. The server process_1 140 and/or server process_2 142 may be executed as a part of the server application 130, or may be other processes somehow related to (e.g., required or used by) the server application 130. During execution of the server process_1 140, the server process_1 140 may generate log messages, such as error log messages or Java exception messages, which are written to a process_1 logs 144 database (e.g., a text file locally stored on the server device 102). Similarly, during execution of the server process_2 142, the server process_2 142 may generate log messages which are written to a process_2 logs 146 database.

In the example embodiment, only two devices 102, 104 are shown in FIG. 1 for purposes of convenience. Further, only a single client application 120 and a single server application 130 with two processes are shown for purposes of convenience. It should be understood that the logging framework described herein may be implemented on any number of devices, and with any number of applications and processes that enables the systems and methods described herein.

In the example embodiments described herein, the client application 120 is a web server (e.g., an HTTPD server answering HTTP requests for web pages having dynamic content) and the server application 130 is a middleware application or framework that generates dynamic web pages with data from a content database (not separately shown). As such, the server process_1 140 may be a process associated with the server application 130, and the server process_2 142 may be a listener for a relational database which answers database queries submitted by the server process_1 140 and other processes (not shown). It should be understood that the example application flow described herein (e.g., dynamic webpage processing) is merely an example of an application flow, and that any such application flow that enables the systems and methods described herein may be used.

During successful operation, and for example, a web page request 160 for dynamic content may be transmitted from the client application 120 to the server application 130 (e.g., server process_1 140). As a part of constructing the dynamic page for the request 160, the server process_1 140 makes a request 162 to the server process_2 142 for data from the database. The server process_2 142 responds 164 with the requested data. The server process_1 140 forms the dynamic page and responds 166 to the client application 120, completing an application request and response flow between the client device 104 and the server device 102.

However, in some situations, there may be failures as a part of this application request and response flow. These failures may trigger the processes, the applications, and/or the underlying operating systems to generate log messages. To address at least some of these log messages, the server device 102 and the client device 104 each include a logging component 150A and 150B, respectively (collectively, logging components 150), which may be similar to each other. The logging components 150 are a part of the logging framework 110. The logging components 150 alter or augment aspects of the processing of log messages on each device 102, 104, or more specifically, for the applications 120, 130 and/or the processes on each device 102, 104. More specifically, the logging components 150 tag and transmit log messages from the devices 102, 104 to the logging agent device 114 for processing, storage, and analysis. The operations of the logging components 150 and logging agent device 114 are described in greater detail below.

Figure 2:
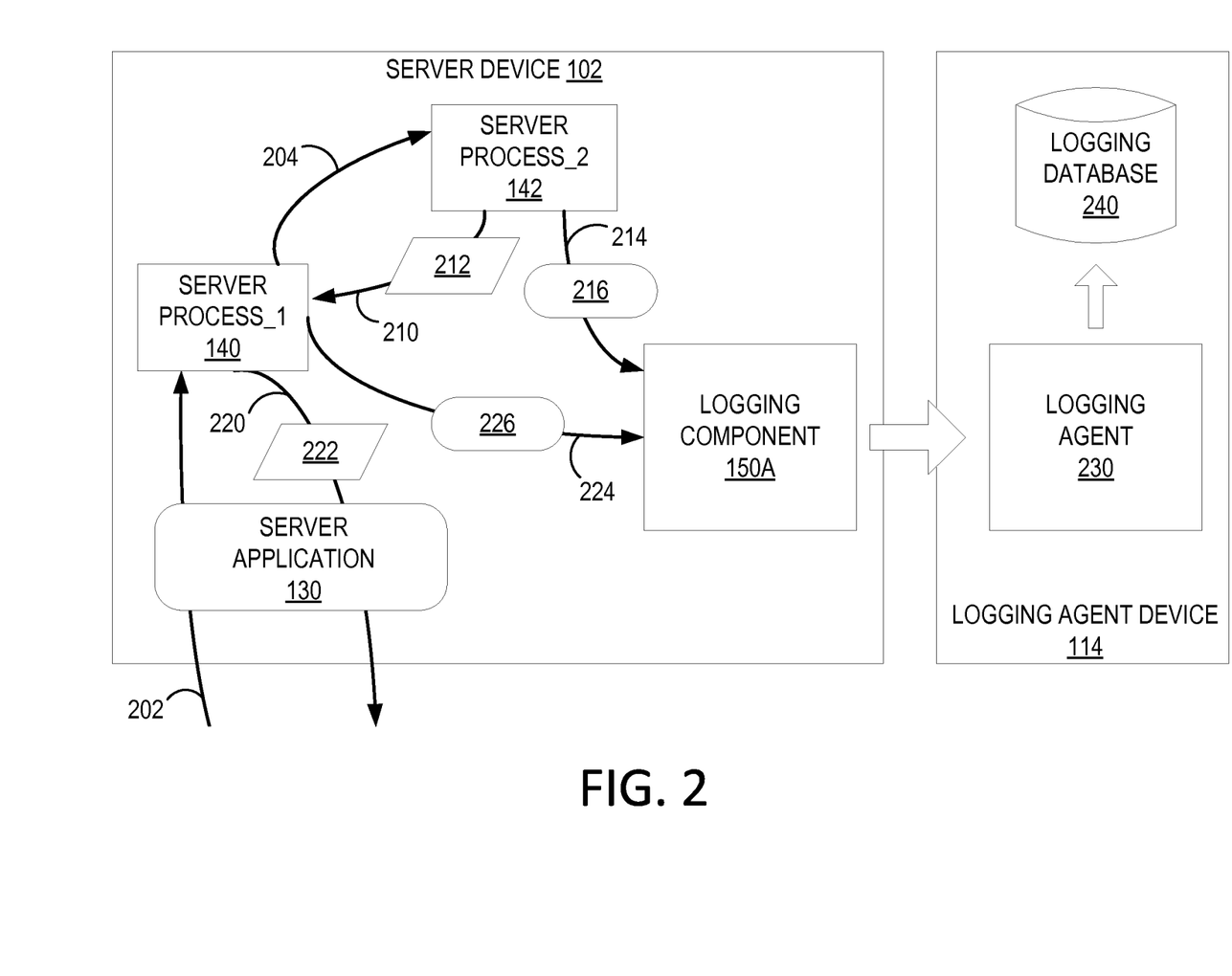
FIG. 2 and FIG. 3 are a block diagrams illustrating an example failure scenario in which the logging framework captures and processes a series of related log events on the server device and the client device.
Figure 3:
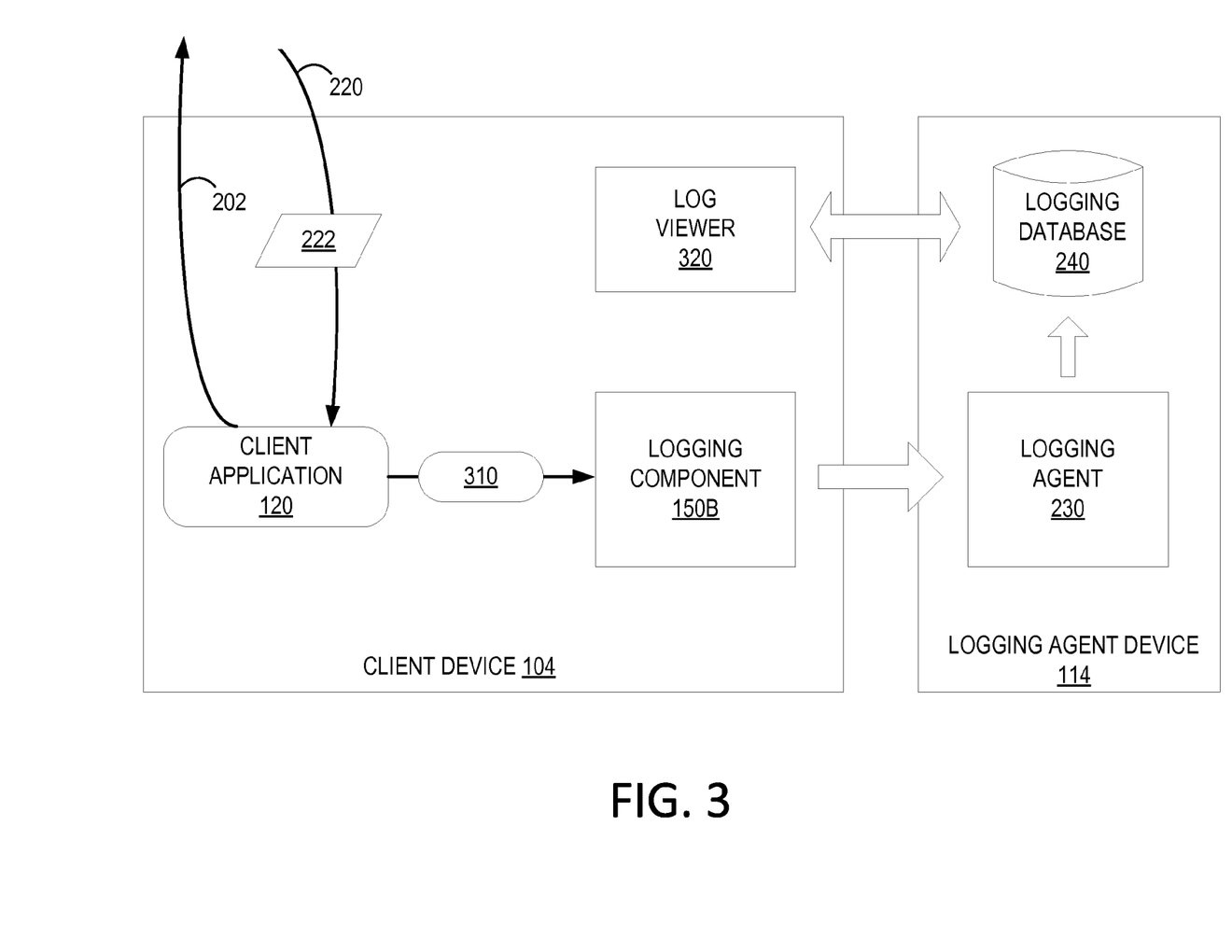

FIG. 2 and FIG. 3 are a block diagrams illustrating an example failure scenario in which the logging framework 110 captures and processes a series of related log events on the server device 102 and the client device 104. In the example embodiment, the logging components 150 are a software component local to the devices 102, 104 (e.g., installed on the devices 102, 104). In some embodiments, the logging component(s) 150 include a Java logging framework such as log4j. The logging components 150 may include a Logger component, which may be integrated into or otherwise used by resident applications (e.g., the applications 120, 130), processes (e.g., the server process_1 140 and the server process_2 142), or the underlying operating system (not shown).

Referring now to FIG. 2, in the example embodiment, the logging components 150 include a correlation component (not separately shown). The correlation component is configured to enable the logging framework 110 (e.g., the logging components 150) to tag and track a series of related log events. More specifically, the correlation component may generate an event identifier (ID) that the logging framework 110 uses to associate multiple log events, such as from multiple processes (e.g., server process_1 140 and server process_2 142), multiple applications (e.g., server application 130 and client application 120), multiple computing devices (e.g., server device 102 and client device 104), or any combination thereof.

To describe the operations of the logging framework 110, FIG. 2 illustrates an example application flow similar to the application flow shown in FIG. 1. The server application 130 (e.g., the server process_1 140) receives a request 202 from the client application 120. The request 202 may be similar to the request 160 shown in FIG. 1 (e.g., another request for dynamic content). The server process_1 140 transmits a request 204 to the server process_2 142, which may also be similar to the request 162 shown in FIG. 1 (e.g., another request for data from the content database).

In this example flow, the request 204 encounters a failure scenario while being processed by the server process_2 142. For example, presume the content database has gone offline or is otherwise unable to process the request 204. As such, the server process_2 142 generates a log event associated with the request 204 (e.g., "unable to read the database"). This example log event is referred to herein as an "original" log event because the server process_2 142 is an "originating entity" for this log event. An original log event is the first log event in a series of related log events (e.g., log events all stemming from a single underlying error, and within a common application flow). An originating entity of an original log event is an entity that participates in the logging framework 110, and that is the first entity within the logging framework 110 to identify the log event. As such, there is only one originating entity for each log event, and only one original log event in a series of related log events.

At the time of an original log event, such as the failure to process the request 204, the logging component (e.g., the correlation component) is configured to generate the event ID that will be assigned to track this example series of related log events. In some embodiments, all generated exceptions will cause the event ID to be generated, unless the exception is passed from another entity (e.g., and already has an event ID included). Presume the example event ID is "abc123", for sake of simplicity.

In the example embodiment, the server process_2 142 uses the correlation component to generate the event ID "abc123". Further, the server process_2 142 generates a response message 212 that includes the event ID, as well as other data associated with the log event, referred to herein as "log data" or "event data." This event data includes the event ID and may include other data such as timestamp information, device information, process ID, process name, and trace information, to name but a few. The server process_2 142 transmits the response message 212 as a part of a response 210 back to the server process_1 140.

Further, the logging components 150 include a caching component (not separately shown). The caching component is configured to transmit log messages to a logging agent 230 on the logging agent device 114 for centralized processing, storage, and analysis of log events and associated event data. The event data transmitted by the caching component to the logging agent 230 also includes the event ID.

In the example embodiment, the server process_2 142 uses the caching component to generate a caching message 216 that includes the event ID, as well as some or all of the event data described above in relation to the response message 212. The server process_2 142, through the caching component of the logging component 150A, caches and transmits the caching message 216 as a part of a cache transmittal 214 to the logging agent 230.

The server process_1 140, in the example shown in FIG. 2, receives the response message 212 from the server process_2 142. Since the response message 212 indicates a failure (e.g., an exception during the processing of the request 204), the server process_1 140 may also designate the request 202 as a failure (e.g., a reciprocal exception). However, unlike the failure encountered by the server process_2 142, the failure encountered by the server process_1 140 is not considered an original log event (and thus the server process_1 140 is not considered an originating entity). The server process_1 140 extracts the event ID from the response message 212, and may extract other event data as well. The server process_1 140 then generates a response message 222 to send back as part of a response 220 to the entity associated with the request 202 (e.g., the client application 120). The response message 222 includes at least the event ID (e.g., the event ID generated by the server process_2 142 and cascaded to the server process_1 140). The response message 222 may also include additional event data, which may include event data from the response message 212 and/or event data associated with the subsequent exception within the server process_1 140.

In addition, and similar to the caching performed by the server process_2 142, the server process_1 140 also generates a caching message 226 using the caching component of the logging component 150A, and transmits the caching message 226 as a part of a cache transmittal 224 to the logging agent 230. This caching message 226 includes the event ID, as well as any of the event data from the response message 222.

The logging agent 230, in the example embodiment, is hosted on a separate computing device, the logging agent device 114. The logging agent 230 is a single point of contact for receiving log events such as the caching messages 216 and 226 (e.g., from the caching components on the server device 102 and the client device 104). The generated error logs are posted to a queue on which the logging agent 230 listens. The logging agent 230 parses event data from the caching messages 216, 226, and stores the event data in a logging database 240. In the example embodiment, the logging database 240 is a relational database hosted by the logging agent device 114. In other embodiments, the logging database 240 may be any type of database that enables operation of the systems and methods described herein, and further may reside on a different computing device than the logging agent 230.

The logging database 240 includes event data from each of the caching messages 216, 226 received. More specifically, in the example embodiment, the logging database 240 includes a log table in which each row represents a single log event (e.g., one row for the caching message 216, and another row for the caching message 226). The log table (not separately shown) includes a column for event IDs, as well as one or more other columns (e.g., for other event data included in the caching messages 216, 226). As such, although the caching messages 216 and 226 each result in their own row in the log table, the rows may be related together because they each include the same event ID, which is unique relative to other event IDs created by other series' of related log events.

Referring now to FIG. 3, the client application 120 receives the response message 222 in the response 220 from the server application 130 (e.g., from the server process_1 140). Since the response message 222 indicates a failure (e.g., an exception during the processing of the request 202), the client application 120 may also designate the request 202 as a failure (e.g., a reciprocal exception). Similar to the failure encountered by the server process_1 140, the failure encountered by the client application 120 is not considered an original log event. As such, the client application 120 extracts the event ID from the response message 222, and may extract other event data as well. In some embodiments, the client application 120 may generate a response message (not separately shown), similar to the response messages 212, 222, for transmittal back to a requesting device (e.g., a web browser), and that response message may or may not contain the event ID.

Similar to the caching performed by the server process_1 140 and the server process_2 142, the client application 120 also generates a caching message 310 using the caching component of the logging component 150B, and transmits the caching message 310 to the logging agent 230, similar to the processing of the caching messages 216, 226. This caching message 310 also includes the event ID, as well as any of the event data from the response message 222, or locally generated by the log event on the client device 104. As such, and as described above, an additional row is written into the logging database 240 by the logging agent 230 based on the caching message 310. This additional row also includes the same event ID as the two server-side log events (e.g., of the caching messages 216, 226). As such, this series of related log events are all generated as a part of an originating log event occurring on the originating entity, the server process_2 142. All of the related log events are centrally stored on the logging database 240, and all are related based on a shared event ID.

A log viewer 320 is the end-user interface for examining and analyzing the logged errors stored by the logging agent 230 in the logging database 240. In the example embodiment, a user such as an application administrator may analyze log events captured by the logging framework 110 using the log viewer 320. In some embodiments, the log viewer 320 provides a user interface that includes a single row for each series of related log events (e.g., for each unique event ID). More specifically, and for example, the log viewer 320 may identify the three rows stored for the series of log events illustrated in FIGS. 2 and 3 (e.g., caching messages 216, 226, and 310). This series may be displayed as a single row with the shared event ID for those messages, along with optionally other information associated with the event ID. The log viewer 320 may enable the user to click on a row such as this and "expand" the view into greater detail. For example, the expanded view may include a row for each log event in the series. Each of these additional rows may include log information associated with that particular log event. As such, the log viewer 320 enables the user see a summary of a particular series of log events, as well as examine details of the related log events that are correlated by this logging framework 110 based on the shared event ID.

The logging components 150 are illustrated in FIGS. 2 and 3 as separate from the applications 120, 130 and the processes 140, 142, but in some embodiments, some or all of the logging components 150 may be integrated into the applications 120, 130 and/or processes 140, 142 (e.g., as a shared library, or as an extension of a logging framework such as log4j, as described herein).

In some embodiments, the correlation component described above is an extension of Apache's log4j, referred to herein as "LinkedException", which extends the java.lang.Exception class. Under this example logging framework 110, exceptions either use or extend LinkedException. For example:

```
public class LinkedException extends Exception {
    private static final long serialVersionUID = 1L;
    String id;
    public LinkedException( ) {
        id = IDGenerator.generateId( );
    }
```

-continued

```
    public LinkedException(String id) {
        this.id = id;
    }
    public LinkedException(LinkedException e) {
        id = e.getId( );
    }
    public LinkedException(Exception e) {
        super(e);
        id = IDGenerator.generateId( );
    }
    private String getId( ) {
        return this.id;
    }
}
```

There are four overloaded constructors in the above example source code. The first constructor with no arguments, "LinkedException ( )", may be used whenever a new exception is created (e.g., an original log event generated by an originating entity, such as the server process_2 142). The second constructor, "LinkedException (String id)", takes an event ID as an argument, and may be called by other non-originating entities, such as the server process_1 140 and the client application 120. As such, even though the non-originating entities may create a new instance of the exception class, the same event ID is maintained (e.g., the event ID from the originating entity). The third constructor, "LinkedException (LinkedException e)", may be used when exceptions are re-thrown with different messages, but where the event ID needs to be the same (e.g., for purposes of linking) The fourth constructor, "LinkedException (Exception e)", may be used whenever a new instance of the Linked Exception has to be generated from any exception. This call generates a new ID and maintains the exception context by calling the super class constructor.

As such, in the example illustrated in FIGS. 2 and 3, because the server process_2 142 is the originating entity, the server process_2 142 is configured to throw an instance of LinkedException upon encountering the failure (e.g., an exception), which thereby generates the unique event ID.

In the example embodiment, the ID generation is based on time (e.g., system time) such that the generated event IDs are unique, or with a very high probability of being unique:

```
public class IDGenerator {
    private String timestamp( ) {
        Long temp= new Date( ).getTime( );
        String tstamp = temp.toString( );
        String tstamp1 = tstamp.substring(0, 8);
        String tstamp2 = tstamp.substring(8, 11);
        String total = tstamp1 + '-' + tstamp2;
        return total;
    }
    private String complex( ) {
        String [ ]s = new String[100];
        String str = "0123456789abcdef";
        String tohex[ ];
        tohex = str.split("");
        for (int i = 0; i < 24; i++) {
            s[i] = ((Double)Math.floor(Math.random( ) *
0x10)).toString( );
        }
        // Set 4 high bits of time_high field to version
        s[2] = "4";
        // Specify 2 high bits of clock sequence
        s[7] = ((Integer)((Integer.parseInt(s[7]) &
0x3) | 0x8)).toString( ); for (int i = 0; i < 24; i++) {
            s[i] = tohex[Integer.parseInt(s[i])];
        }
```

```
        s[1] = s[6] = s[11] = "-";
        return Arrays.asList(s).toString( ).replaceAll("(^\\[|\\]$)",
            "").replace(", ", ",");
    }
    private String generateID( ) {
        String strTime = timestamp( );
        String strComplex = complex( );
        String uniqueID = strTime + strComplex;
        return uniqueID;
    }
}
```

Further, in some embodiments, the Logger component (e.g., the caching component) of Apache log4j is extended by the LinkedLogger class, and is configured to cache the messages (e.g., for transfer to the logging agent 230) in addition to writing log events and event data to the local log files (e.g., logs 122, 132, 144, 146):

```
public class LinkedLogger extends Logger{
    private CacheFactory factory;
    public LinkedLogger(String name) {
        super(name);
        factory = CacheFactory.getInstance( );
    }
    @override
    public void fatal(Object message) {
        super.fatal(message);
        try{
            LinkedException ex = (LinkedException)message;
            factory.addToCache(message);
        }catch(Exception ex){
        }
    }
    @override
    public void error(Object message) {
        super.error(message);
        try{
            factory.addToCache(message)
        }catch(Exception ex){
        }
    }
    public void logException(Object message){
        super.error(message);
        try{
            factory.addToCache(message)
        }catch(Exception ex){
        }
    }
}
```

In the above example, LinkedLogger gets an instance of CacheFactory, and both error and fatal methods are overridden to add messages to the cache. Both error and fatal methods call addToCache on the CacheFactory object. Further, the number of messages to be cached is a configurable parameter. For example, to attain real-time experience, the user may set this parameter to 1.

In some embodiments, log4j is customized to log exceptions in a particular layout by customizing the log4j.properties file. The logger writes the messages in the log file in a format specified in the layout, which can be understood by the parser. While formatting, all of the relevant details are collected either from the exception or from session or system details:

```
private String format(LinkedException ex) throws IOException
{
    StringBuffer line = new StringBuffer( );
    //Error ID
    StringBuffer errId = new StringBuffer( );
    errID.append(ex.getID( ));
    line.append(errId.toString( ));
    line.append("|");
    //Timestamp
    StringBuffer bufferDate = new StringBuffer( );
    bufferDate.append(getLogDateFormatted( ));
    line.append(bufferDate.toString( ));
    line.append("|");
    // Device Name
    StringBuffer deviceName = new StringBuffer( );
    deviceName.append(Runtime.getRuntime( ).exec("hostname"));
    line.append(deviceName.toString( ));
    line.append("|");
    // Process ID
    StringBuffer pid = new StringBuffer( );
    pid.append(getPID( ));
    line.append(pid.toString( ));
    line.append("|");
    // Process Name
    StringBuffer processName = new StringBuffer( );
    processName.append(getProcessName( ));
    line.append(processName.toString( ));
    line.append("|");
    // extract thid from name
    String thid = Thread.currentThread( ).getName( );
    thid = thid.substring(1 + thid.indexOf("-"));
    line.append(thid);
    line.append("|");
    // Trace
    StringBuffer trace = new StringBuffer( );
    trace.append(ex.getStackTrace( ));
    line.append(trace.toString( ));
    line.append("|");
    // Thread name
    String thidName = Thread.currentThread( ).getName( );
    thidName = thidName.split("-")[0];
    line.append(thidName);
    line.append("|");
    // user
    StringBuffer user = new StringBuffer( );
    user.append(System.getProperty("user.name"));
    line.append(trace.toString( ));
    line.append("|");
    // message
    StringBuffer bufferMsg = new StringBuffer( );
    bufferMsg.append(ex.getMessage( ));
    line.append(bufferMsg);
    return line.toString( );
}
```

As shown by the code snippet above, the exception is processed to extract error ID, timestamp, device name, process ID, process name, thread ID, trace, thread name, user and message.

In some embodiments, CacheFactory is a singleton class which is shared by all loggers. This information is converted to a JSON string and added to the cache. Cached messages are sent to the queue of the logging agent 230 once the logging components 150 reach their cache limit. As shown in the code snippet below, the addToCache method parses the exception to create a JSON string, adds the message to the cache, and checks the queue size to see if the limit is crossed. If so, the messages are posted to the logging agent 230:

```
public void addToCache(Object message) throws Exception{
    String json = parseMessage(message);
    if(checkLimits( )){
        postToAgent(json);
    }
    messages.add(json);
}
```

```
private Boolean checkLimits( ) {
    if(messages.size( ) == LIMIT)
        return true;
    return false;
}
private String parseMessage(Object message) {
    Object json = ExceptionParser.parseException(message);
    return json.toString( );
}
public void postToAgent(String json) throws Exception{
    String destinationName = "queue/logQueue";
    ConnectionFactory cf = null;
    Connection connection = null;
    try
    {
        if(context == null)
            context = getInitialContext( );
        cf = (ConnectionFactory)context.lookup("/ConnectionFactory");
        Queue queue = (Queue)context.lookup(destinationName);
        connection = cf.createConnection( );
        Session session = connection.createSession(false,
            Session.AUTO_ACKNOWLEDGE);
        MessageProducer publisher = session.createProducer(queue);
        connection.start( );
        TextMessage message = session.createTextMessage(json);
        publisher.send(message);
    }
    finally
    {
        closeConnection(connection);
    }
}
public static Context getInitialContext( ) throws
javax.naming.NamingException
{
    Properties p = new Properties ( );
    p.put(Context.INITIAL_CONTEXT_FACTORY,
        "org.jnp.interfaces.NamingContextFactory");
    p.put(Context.URL_PKG_PREFIXES, "
        org.jboss.naming:org.jnp.interfaces");
    p.put(Context.PROVIDER_URL, JMS_URL);
    context= new javax.naming.InitialContext(p);
    return context;
}
```

For a message to be posted to the queue, a connection is created to the destination queue. To create this queue, the context based on the JMS_URL configured in the properties file is needed. This file is read during the initialization of CacheFactory. JMS_URL in the getInitialContext( ) holds this value. Once the connection is set and the context is created, MessageProducer is instantiated to post the messages. For example, the following is a sample JSON string which may be created and posted to the queue:

```
{
"id":1,
"Error ID" : "997E44DBDF24916A02E31E0CE67F6363",
"Timestamp" : "2015 02 09 12:08:06.476",
"DeviceName" : "",
"ProcessId": "131",
"ProcessName" : "aps_search1",
"ThreadId" : "12652",
"Trace" : "java.lang.NoClassDefFoundError- com.businessobjects . . . at
    java.lang.Class.getDeclaredConstructors0(Native Method) at
    ...
    at java.lang.Thread.run(Thread.java:763)",
"ThreadName" : "service builder-2",
"User" : "",
"Text" : "Caught exception while loading agent [Search Agent]"
}
```

The JSON structure is designed in congruence to a database schema of the logging database 240 such that all the keys in the JSON string map to particular columns in the database (e.g., in the log table).

As another example, consider an Example_Caller (caller) and an Example_Callee (callee), which may be similar to, for example, the server process_1 140 (e.g., as the caller) and the server process_2 142 (e.g., as the callee):

```
public class Example_Callee {
    public void process( ) throws LinkedException{
        LinkedLogger linkedLogger = new LinkedLogger( );
        String test = null;
        try{
            System.out.println(test.length( ));
        }
        catch (Exception e){
            LinkedException exp = new LinkedException(e);
            linkedLogger.logException(exp);
            throw(exp);
        }
    }
}
public class Example_Caller {
    LinkedLogger logger = new LinkedLogger( );
    public Example_Caller( ){
        Example_Callee callee = new Example_Callee( );
        try {
            callee.process( );
        } catch (LinkedException e) {
            logger.logException(e);
        }
    }
}
```

In this example, the Example_Caller (caller) creates an instance of Example_Callee and calls a method "process" on the object. Further, the callee encounters an exception. It logs the exception and throws an instance of LinkedException. As such, when an instance of LinkedException is created, a unique event ID is generated (e.g., because the callee is the originating entity for this log event). Additionally, however many times the LinkedException is logged, the same event ID is maintained.

Further, in this example, the communication between the caller and the callee is through a direct function call. This communication method may be, for example, an Ajax call, an HTTP request/response, RMI, and so forth. In each of these cases, the event ID is maintained, and is propagated across various components and logged separately (e.g., in different log files, and in different rows in the log table). As such, all of the log events in a series of related log events will include the same event ID, which will be used as a key for identification and correlation between individual log events.

Figure 4:
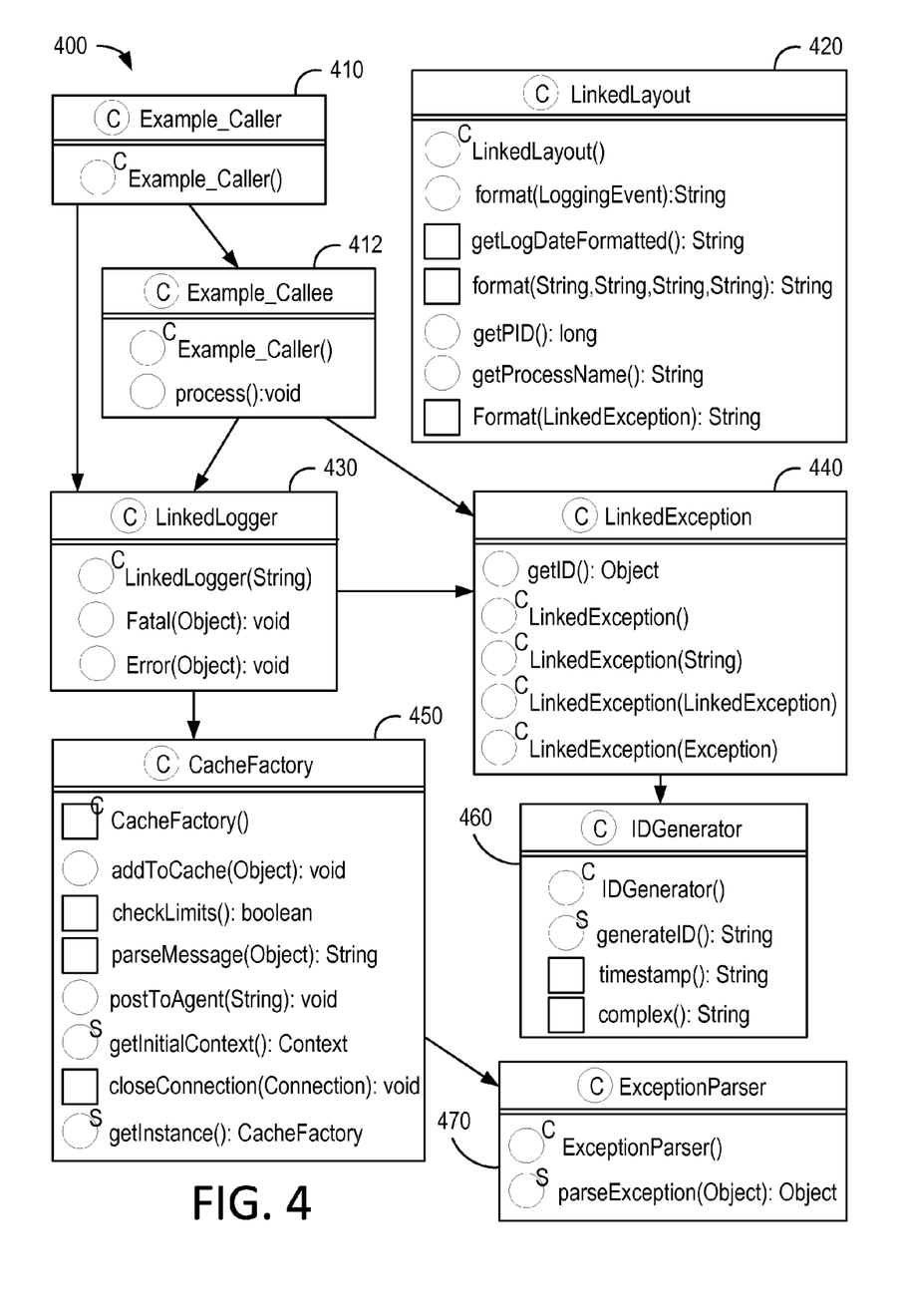
FIG. 4 is a class diagram illustrating example Java classes implemented by the logging framework.

FIG. 4 is a class diagram 400 illustrating example Java classes implemented by the logging framework 110. In the example embodiment, the classes shown in FIG. 4 include an "Example_Caller" class 410 and an "Example_Callee" class 412, which may be similar to the Example_Caller and Example_Callee described above with respect to FIG. 3. A "LinkedLayout" class 420 is also provided. The Example_Caller 410 and Example_Callee 420 classes both refer to a "LinkedLogger" class 430, which may be similar to the LinkedLogger class described above. The Example_Callee class 412 and the LinkedLogger class 430 also refer to a "LinkedException" class 440, which may be similar to the LinkedException class described above. The LinkedException class 440 refers to an "IDGenerator" class 460, which may be similar to the IDGenerator class described above. The LinkedLogger class 430 also refers to a "CacheFactory" class 450, which may be similar to the CacheFactory class described above. The CacheFactory class 450 refers to an "ExceptionParser" class 470, which may be similar to the ExceptionParser class described above.

Figure 5:
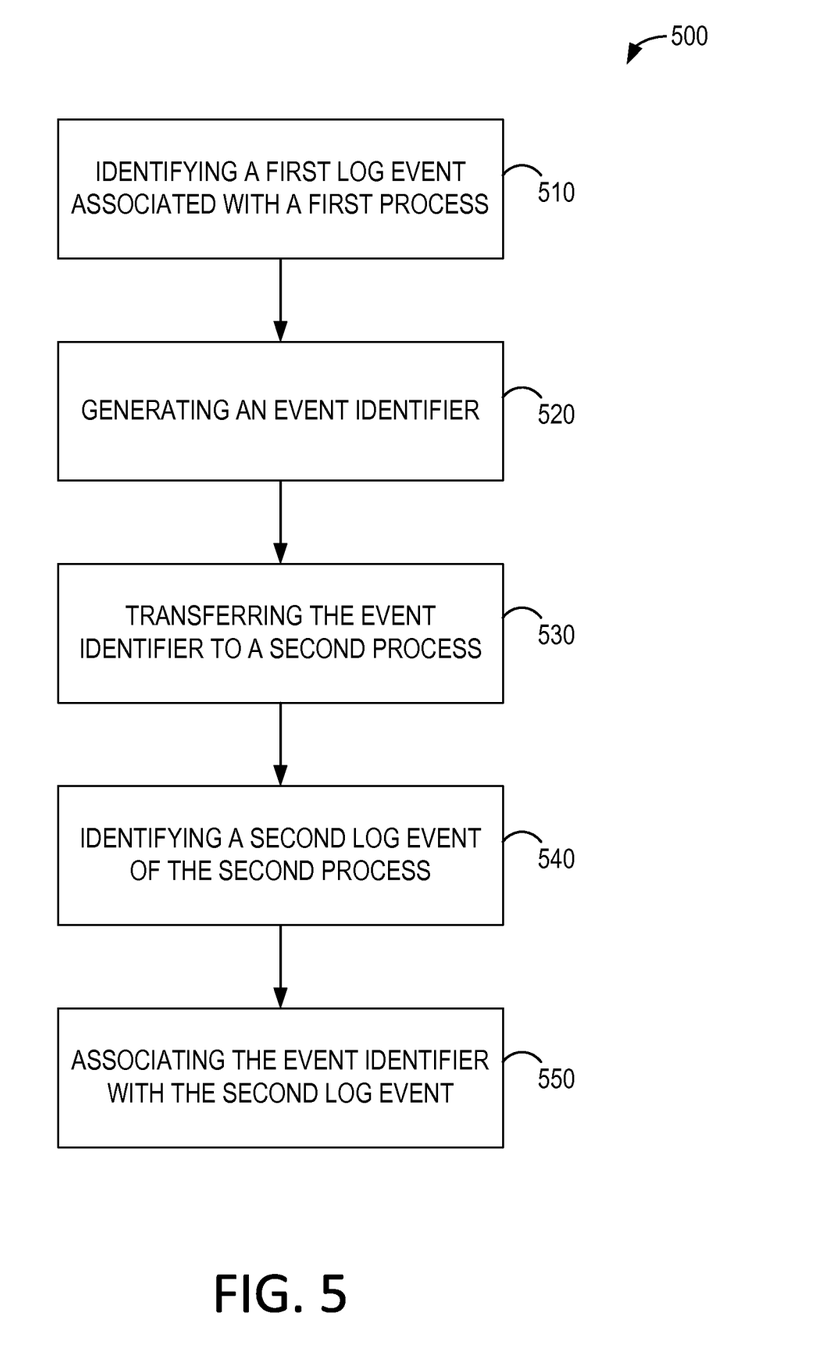
FIG. 5 illustrates a method, in accordance with an example embodiment, for providing a logging framework, such as the logging framework.

FIG. 5 illustrates a method 500, in accordance with an example embodiment, for providing a logging framework, such as the logging framework 110. The method 500 is performed by one or more computing devices each comprising at least one processor. In the example embodiment, the method 500 includes identifying a first log event associated with a first process (see operation 510). Thereafter, at operation 520, the method 500 generates an event identifier (ID) based on the first log event. The event ID is then transferred to a second process, as shown by operation 530. The method 500 then identifies a second log event associated with the second process and based on the first log event at operation 540, and subsequently associates the event ID with the second log event at operation 550.

In some embodiments, the method 500 includes transmitting first log event data to a logging agent, the first log event data including the event ID, and transmitting second log event data to the logging agent, the second log event data also including the event ID. In some embodiments, the method 500 includes storing the first log event data and the second log event data in a database, and correlating the first log event data and the second log event data based on the event ID.

In some embodiments, the method 500 is performed as an extension of a Java-based logging tool. In some embodiments, the first process is a callee process, the second process is a caller process, and transferring 530 the event ID to the second process further includes generating a response message associated with a request from the caller process to the callee process, the response message including the event ID, and transmitting the response message to the second process in response to the request. In some embodiments, associating 550 the event ID with the second log event is performed based on the second process receiving the response message from the first process. In some embodiments, generating 520 the event ID further includes determining that the first log event is an original log event prior to generating the event ID.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 6:
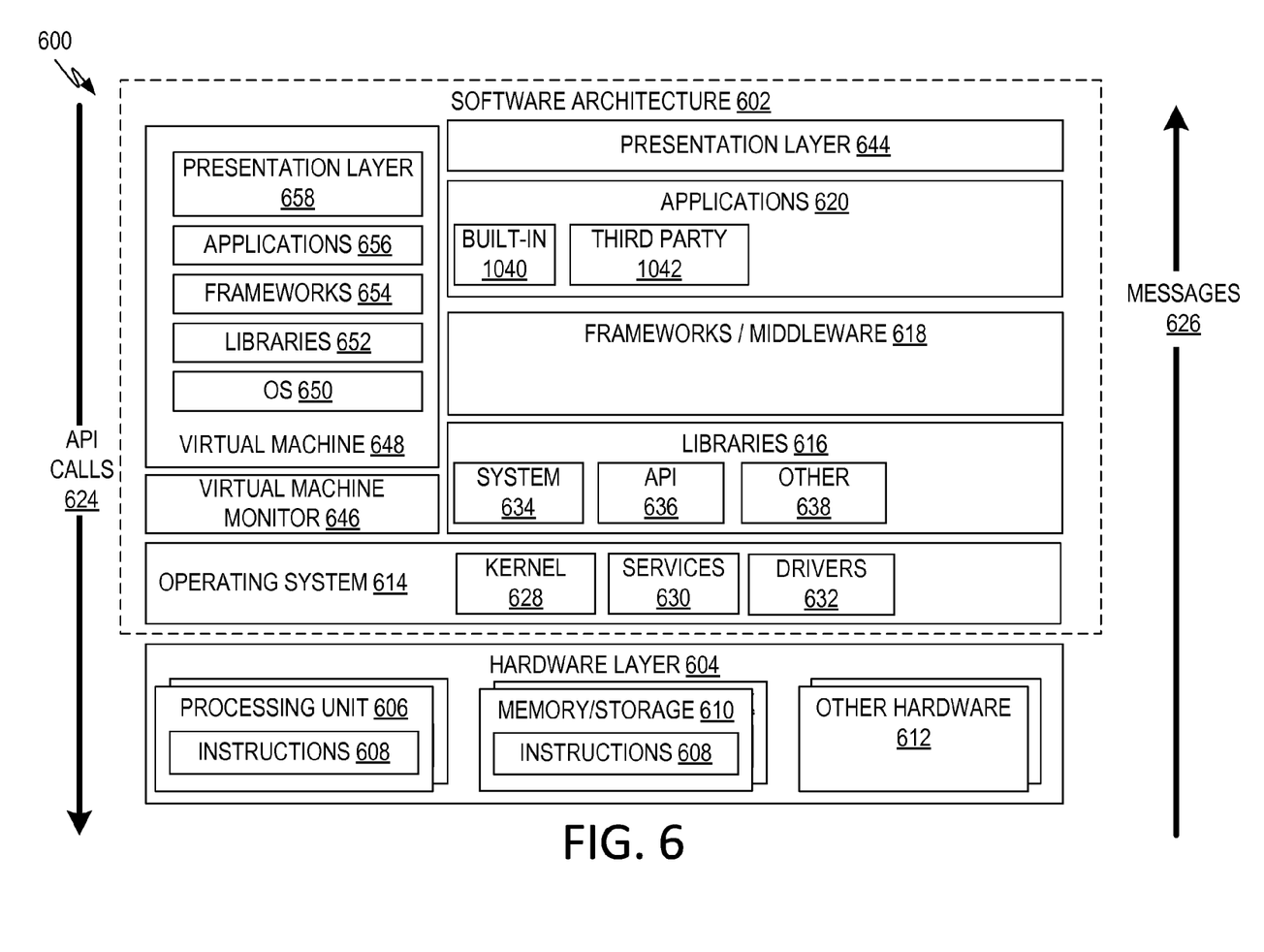
FIG. 6 is a block diagram illustrating an example software architecture, which may be used in conjunction with various hardware architectures herein described.

FIG. 6 is a block diagram 600 illustrating an example software architecture 602, which may be used in conjunction with various hardware architectures herein described. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620 and a presentation layer 644. Operationally, the applications 620 and/or other components within the layers may invoke application programming interface (API) calls 624 through the software stack and receive a response as messages 626. The layers illustrated are representative in nature and not all software architectures have all layers. For example, some mobile or special purpose operating systems may not provide the frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 642 may invoke the API calls 624 provided by the mobile operating system such as operating system 614 to facilitate functionality described herein.

The applications 620 may use built-in operating system functions (e.g., kernel 628, services 630 and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. In the example of FIG. 6, this is illustrated by a virtual machine 648. The virtual machine 648 creates a software environment where applications/modules can execute as if they were executing on a hardware machine (such as the machine 700 of FIG. 11, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648 such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
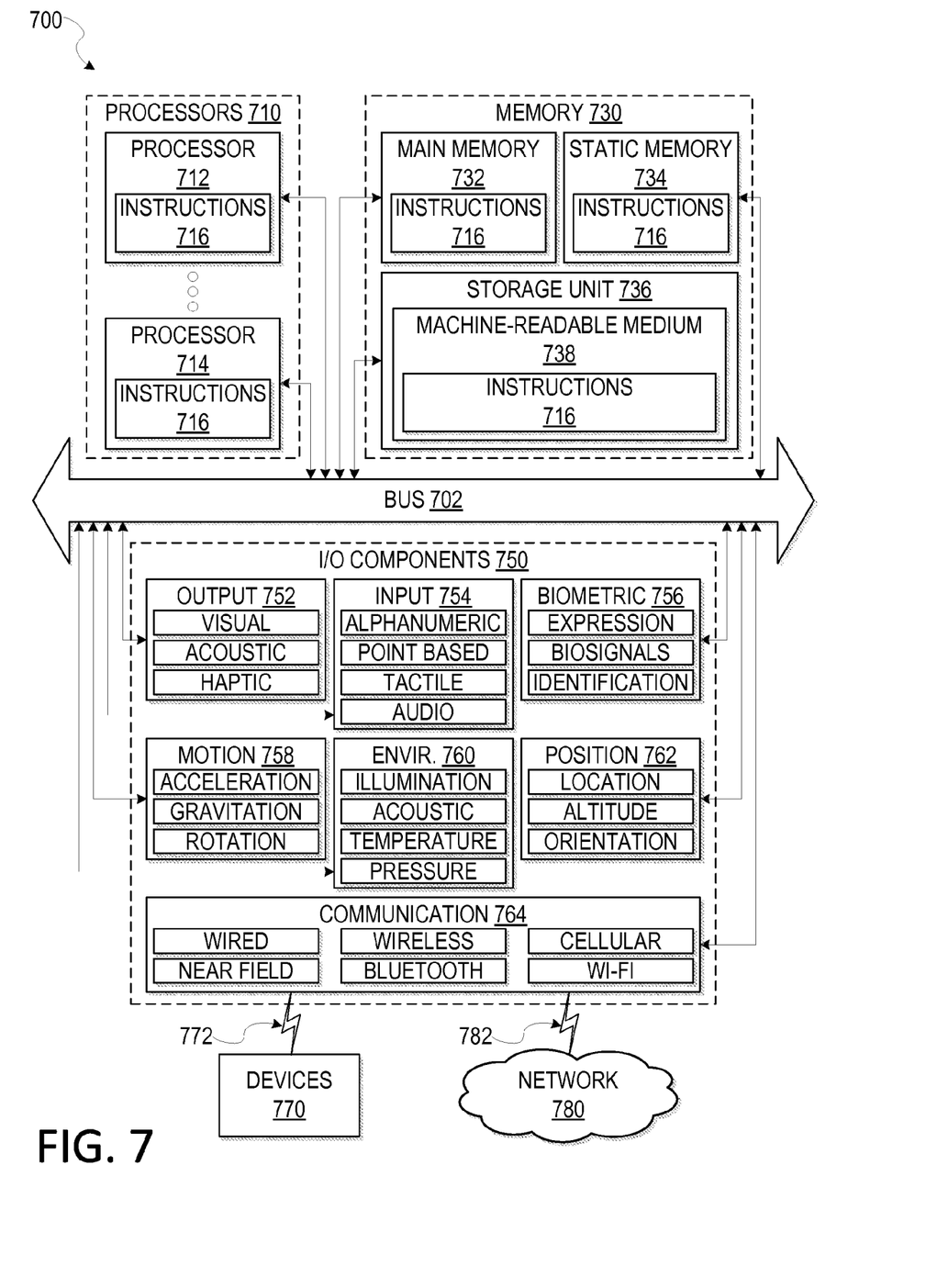
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that may execute the instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of processors 710 are examples of machine-readable media 738.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific input/output (I/O) components 750 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 750 may include many other components that are not shown in FIG. 7. The input/output (I/O) components 750 are grouped according to functionality merely for simplifying the following discussion and the grouping is in no way limiting. In various example embodiments, the input/output (I/O) components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 762, such as, location via Internet Protocol (IP) geo-location, location via Wi-Fi® signal triangulation, location via detecting a NFC beacon signal that may indicate a particular location, and so forth.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
  one or more processors executing a first process and a second process;
  a memory storing log information for the first process and the second process; and
  one or more logging components, executing on the one or more processors, configured to, at least:
  identify a first log event, the first log event associated with the first process;
  link the first log event with a unique event identifier (ID), the unique event ID uniquely identifying an event stemming from a common underlying error condition across multiple server processes;
  transfer the unique event ID to the second process;

identify a second log event, the second log event associated with the second process;

link the unique event ID with the second log event based on the second log event stemming from the common underlying error condition;

in response to receiving the first log event and the second log event at a logging agent, storing the first log event and the second log event as a consolidated log event in a central location; and presenting the consolidated log event in a log viewer, the log viewer including a consolidated view for presentation to an administrator.

2. The system of claim 1, wherein the log viewer is configured to correlate the first log event data and the second log event data based on the unique event ID.

3. The system of claim 1, wherein the one or more logging components are implemented as an extension of a Java-based logging tool.

4. The system of claim 1, wherein the first process is a callee process, the second process is a caller process, and the transferring the unique event ID to the second process further includes:

generating a response message associated with a request from the caller process to the callee process, the response message including the unique event ID; and transmitting the response message to the second process in response to the request.

5. The system of claim 4, further comprising determining that the second log event stems from the common underlying error condition based on the second process receiving the response message from the first process.

6. A computerized method comprising:

identifying, using one or more hardware processors, a first log event, the first log event associated with a first application process executing on a first computing device;

linking the first log event to a a unique event identifier (ID)), the unique event ID uniquely identifying an event stemming from a common underlying error condition across multiple application processes;

transferring the unique event ID to a second application process executing on one of the first computing device and a second computing device;

identifying a second log event, the second log event associated with the second process;

linking the second log event with the unique event ID based on the second log event stemming from the common underlying error condition;

in response to receiving the first log event and the second log event at a logging agent, storing the first log event and the second log event as a consolidated log event in a central location; and presenting the consolidated log event in a log viewer, the log viewer including a consolidated view for presentation to an administrator.

7. The method of claim 6, further comprising:

storing the first log event data and the second log event data in a logging database; and correlating the first log event data and the second log event data based on the unique event ID.

8. The method of claim 6, wherein the method is performed as an extension of a Java-based logging tool.

9. The method of claim 6, wherein the first process is a callee process, the second process is a caller process, and the transferring the unique event ID to the second process further includes:

generating a response message associated with a request from the caller process to the callee process, the response message including the unique event ID; and transmitting the response message to the second process in response to the request.

10. The method of claim 9, further comprising determining that the second log event shares a common cause with the first log event based on the second process receiving the response message from the first process.

11. A non-transitory machine-readable medium storing processor-executable instructions that, when executed by one or more processors, cause the one or more processors to, at least:

identify a first log event, the first log event associated with a first process;

link the first log event to a unique event identifier (ID), the unique event ID uniquely identifying an event stemming from a common underlying error condition across multiple processes;

transfer the unique event ID to a second process;

identify a second log event, the second log event associated with the second process;

link the unique event ID with the second log event based on the second log event stemming from the common underlying error condition;

in response to receiving the first log event and the second log event at a logging agent, storing the first log event and the second log event as a consolidated log event in a central location; and presenting the consolidated log event in a log viewer, the log viewer including a consolidated view for presentation to an administrator.

12. The machine-readable medium of claim 11, wherein the processor-executable instructions further cause the one or more processor to:

store the first log event data and the second log event data in a logging database; and correlate the first log event data and the second log event data based on the unique event ID.

13. The machine-readable medium of claim 11, wherein the first process is a callee process, the second process is a caller process, and the transferring the event ID to the second process further includes:

generating a response message associated with a request from the caller process to the callee process, the response message including the unique event ID; and transmitting the response message to the second process in response to the request.

14. The machine-readable medium of claim 13, wherein the second log event sharing a common cause with the first log event is based on the second process receiving the response message from the first process.

* * * * *